(12) United States Patent
Baudelocque et al.

(10) Patent No.: US 7,217,039 B2
(45) Date of Patent: May 15, 2007

(54) AXIAL LOAD-INSENSITIVE EMERGENCY BEARING

(75) Inventors: Luc Baudelocque, Vernon (FR); Armand Lapierre, Fontaine/Jouy (FR)

(73) Assignee: Societe de Mecanique Magnetique, Saint Marcel (FR)

( * ) Notice: Subject to any disclaimer, the term of this patent is extended or adjusted under 35 U.S.C. 154(b) by 655 days.

(21) Appl. No.: 10/480,429

(22) PCT Filed: Jun. 13, 2002

(86) PCT No.: PCT/FR02/02024

§ 371 (c)(1), (2), (4) Date: Dec. 11, 2003

(87) PCT Pub. No.: WO02/103215

PCT Pub. Date: Dec. 27, 2002

(65) Prior Publication Data

US 2004/0189124 A1    Sep. 30, 2004

(30) Foreign Application Priority Data

Jun. 15, 2001  (FR) .................................. 01 07915

(51) Int. Cl.
*F16C 41/00* (2006.01)
(52) U.S. Cl. ..................... 384/624; 310/90.5
(58) Field of Classification Search ................ 384/102, 384/624; 310/90.5
See application file for complete search history.

(56) References Cited

U.S. PATENT DOCUMENTS

| 3,844,630 A | 10/1974 | Lechner |
| 4,334,718 A | 6/1982 | Hirt et al. |
| 4,629,261 A | 12/1986 | Eiermann et al. |
| 4,657,410 A | 4/1987 | Hibner |
| 5,714,818 A | 2/1998 | Coons et al. |
| 5,977,677 A | 11/1999 | Burns et al. |

FOREIGN PATENT DOCUMENTS

| DE | 198 25 370 A | 12/1999 |
| EP | 0 499 310 A | 8/1992 |
| FR | 2 613 791 | 10/1988 |
| FR | 2614375 | 10/1988 |
| GB | 2 033 977 A | 5/1980 |

OTHER PUBLICATIONS

Patent Abstracts of Japan, vol. 018, No. 076 (M-1556), Feb. 8, 1994 & JP 05 288218 A (Kobe Steel Ltd), Nov. 2, 1993 Abstract.

*Primary Examiner*—William C. Joyce
(74) *Attorney, Agent, or Firm*—Weingarten, Schurgin, Gagnebin & Lebovici LLP (57) ABSTRACT

The emergency bearing for a rotary machine having magnetic bearings comprises an emergency landing device including an intermediate element (9) having a large contact area with a stator element (10), the intermediate element (9) being interposed between a bearing member (1, 2, 3) and the stator element (10) fixed to the stator (15) with radial clearance (11, 13) relative to said stator element (10). A damper element (13) acting in the radial direction is interposed between the intermediate element (9) and the stator element (10), and a contact element (14) having very low friction is implemented between the intermediate element (9) and the stator element (10) to reduce friction during rotary movements between these two elements.

16 Claims, 7 Drawing Sheets

AXIAL LOAD-INSENSITIVE EMERGENCY BEARING

This application is a 371 national phase filing of PCT/FR02/02024 filed Jun. 13, 2002, and claims priority to a French application No. 01 07915 filed Jun. 15, 2001.

FIELD OF THE INVENTION

The present invention provides an emergency bearing that is insensitive to axial load for a rotary machine having magnetic bearings presenting a mean radial airgap $\epsilon_r$ relative to a rotor, the emergency bearing comprising at least one bearing member such that radial clearance is provided between the bearing member and the rotor, the value $\epsilon_r/2$ of the radial clearance being about half the mean radial airgap $\epsilon_r$ of the magnetic bearings, and axial clearance is provided on either side of the bearing member between the bearing member and first and second axial abutment elements.

BACKGROUND OF THE INVENTION

All rotary machinery having active magnetic bearings requires an emergency device commonly referred to as an emergency bearing, to act in the event of one of said magnetic bearings being overloaded or in the event of the electrical or electronic control circuit failing, or indeed in the event of stoppage or of suspension overload. This emergency device provides mechanical redundancy and needs to be defined and dimensioned correctly so as to guarantee fully that the machine will not be damaged, and that the equipment can recover immediately once the overload or servo-control failure has disappeared. Such emergency bearings are generally dry-lubricated rolling bearings, but other types of dry bearing could be used. They present clearance relative to the rotor and in normal operation they do not rotate. The clearance is generally equal to half the airgap, but it can be smaller if necessary. Such bearings as described, for example, in French patent document 2 613 791, are ball bearings or, smooth rings commonly mounted relative to the stator on dampers and presenting radial clearance.

Rotors mounted on magnetic bearings often present nominal speeds of rotation that are very high. Under such circumstances, in the event of the rotor landing on the emergency bearings due to a failure of servo-control or of power supply, the rotor presents whirling movements at its speed of rotation with eccentricity which is then defined by the clearance of the emergency bearing. This whirling motion is also referred to as radial whiplash. Under such circumstances, a very high degree of unbalance can arise leading to destruction of the bearings or to deformation of the rotor.

It is then particularly important for the operation of the damper is guaranteed, where its function is firstly to prevent rotor whirl starting in the event of contact with the emergency bearing, and secondly to limit the frequency of this radial whiplash motion to a frequency that is low enough to avoid damaging the ball bearings or the smooth rings used. Typically, this frequency lies in the range one-fourth to one-third the frequency corresponding to the nominal speed of rotation of the machine. So long as freedom of movement in the radial direction is ensured for the bearings, radial flattening of the assembly strains the metal tape of the damper or any equivalent viscoelastic means, thereby satisfying the above condition.

In certain turbomachines, the axial load in operation can be considerable. So long as the axial magnetic bearing is operating correctly, nothing disturbs proper operation of the emergency bearing for radial failure. However, in the event of high axial loading that is not controlled by the magnetic bearing, the emergency bearing device must also be capable of capable of withstanding the high axial loading.

Figure 1:
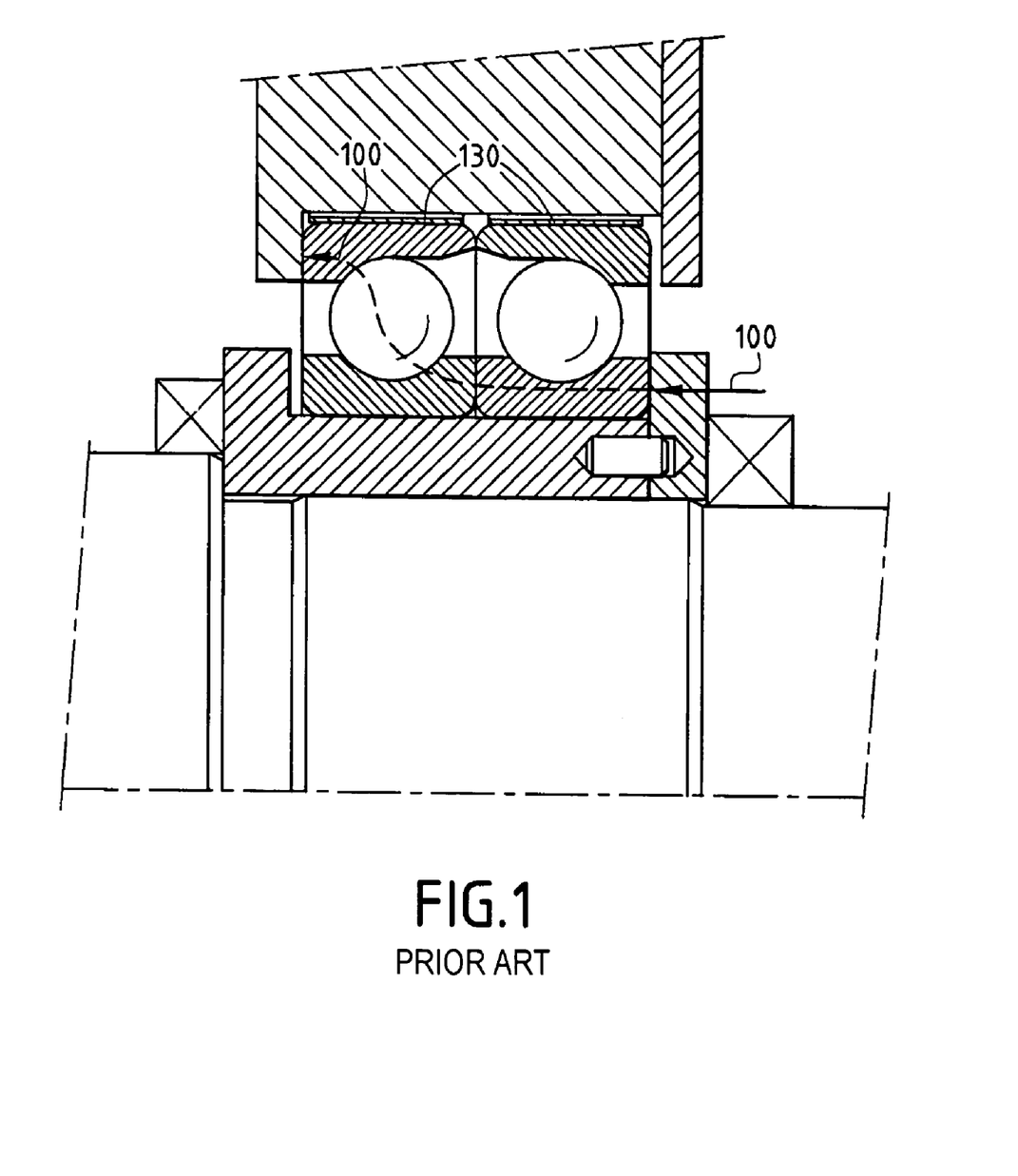
FIG. 1 is an axial half-section view showing diagrammatically the axial load transmitted from the rotor to the stator via a ball in a prior art emergency bearing.

FIG. 1 shows the effect of an axial load 100 transmitted from the rotor to the stator through a ball of a prior art emergency bearing. Since contact area is quite small, it is difficult to organize a coefficient of friction that is very small or to avoid Hertz pressure that is too high. In the event of high axial loading, these two restrictions can lead to the emergency bearing becoming jammed radially in its housing instead of straining the damper device 130. Under such circumstances, the whirl or radial whiplash is synchronous with the speed of rotation and therefore leads to radial loads that are considerable and sometimes destructive of ball bearings (or smooth ring bearings if they are used instead of ball bearings), even if the machine comes to rest quickly, in general after a few seconds due to the braking that comes from the operating process or from the driving machine. This situation can become harmful for the equipment and consequently for magnetic bearing technology.

SUMMARY OF THE INVENTION

The present invention seeks to remedy the above-mentioned drawbacks and to provide an emergency bearing presenting a high degree of operating safety and limited wear, in particular in the event of the magnetic bearings failing or losing power supply.

These objects are achieved by an emergency bearing that is insensitive to axial load for a rotary machine having magnetic bearings presenting a mean radial airgap $\epsilon_r$ relative to a rotor, the emergency bearing comprising at least one bearing member such that radial clearance is provided between the bearing member and the rotor, the value $\epsilon_r/2$ of the radial clearance being about half the mean radial airgap $\epsilon_r$ of the magnetic bearings, and axial clearance is provided on either side of the bearing member between the bearing member and first and second axial abutment elements; the emergency bearing being characterized in that it further comprises an emergency landing device comprising an intermediate element having a large contact area with a stator element, said intermediate element being interposed between the bearing member and said stator element fixed to the stator with radial clearance relative to said stator element, contact means having a very low coefficient of friction being provided between the intermediate element and the stator element to reduce friction during rotary motion between these two elements.

According to an aspect of the invention, the emergency bearing further comprises preloading means interposed between the intermediate element and the bearing member and acting axially thereon.

Preferably, the preloading means are springs fixed to the two extreme sides of the intermediate element, thereby applying preloading in both directions to the bearing member.

In a particular embodiment, the bearing member comprises a stator cage, a rotor cage, and rolling elements disposed between the stator and rotor cages.

In another possible particular embodiment, the bearing member comprises a smooth ring.

The value $\epsilon_r/2$ of the radial clearance may advantageously lie in the range about 0.15 millimeters (mm) to about 0.3 mm, however it may also have other values as a function of the application and the dimensions of the bearing.

Similarly, the value $\epsilon_a$ of the axial clearance may advantageously lie in the range about 0.2 mm to about 0.5 mm, but may also present other values as a function of the application and the dimensions of the bearing.

In another particular embodiment, the intermediate element is a flanged annular female part and the stator element is a male part that matches the female intermediate element.

In which case, the stator element is a part made in two pieces.

In another particular embodiment, the stator element is a flanged annular female part and the intermediate element is a male part that matches the female stator element.

In a possible variant, the intermediate element is a part made in two pieces.

In a first aspect of the invention, the contact means with very low friction comprises a deposit of low friction material on the facing faces of the intermediate element and the stator element that extend perpendicularly to the axis of rotation.

In which case, the low friction material may comprise polytetrafluoroethylene (PTFE) or molybdenum disulfide ($MoS_2$).

In a second particular aspect of the invention, the contact means having very low friction is made by applying surface treatment to the facing faces of the intermediate element and the stator element that extend perpendicularly to the axis of rotation.

In a third particular aspect of the invention, the contact means having very low friction is an axial ball bearing interposed between the facing faces of the intermediate element and the stator element that extend perpendicularly to the axis of rotation.

In a particular embodiment, the damper means is constituted by a corrugated metal strip interposed between facing annular faces of the inner portions of the intermediate element and of the stator element that extend parallel to the axis of rotation.

In another embodiment, the damper means are constituted by a viscoelastic ring interposed between the facing annular faces of the inner portions of the intermediate embodiment and of the stator element that extend parallel to the axis of rotation.

BRIEF DESCRIPTION OF THE DRAWINGS

Other characteristics and advantages of the invention appear from the following description of particular embodiments given as examples and with reference to the accompanying drawings, in which.

DESCRIPTION OF THE PREFERRED EMBODIMENTS

FIGS. 2 to 5 correspond to various embodiments of emergency bearings each comprising a series of structural elements of shape that can vary from one embodiment to another, but of function that is the same. The elements of structure that remains essentially the same are given the same reference numbers in the various different embodiments, whereas elements of differing configuration and presenting essentially the same function are given reference numbers that are different, but in which the last two digits remain the same.

Figure 2:
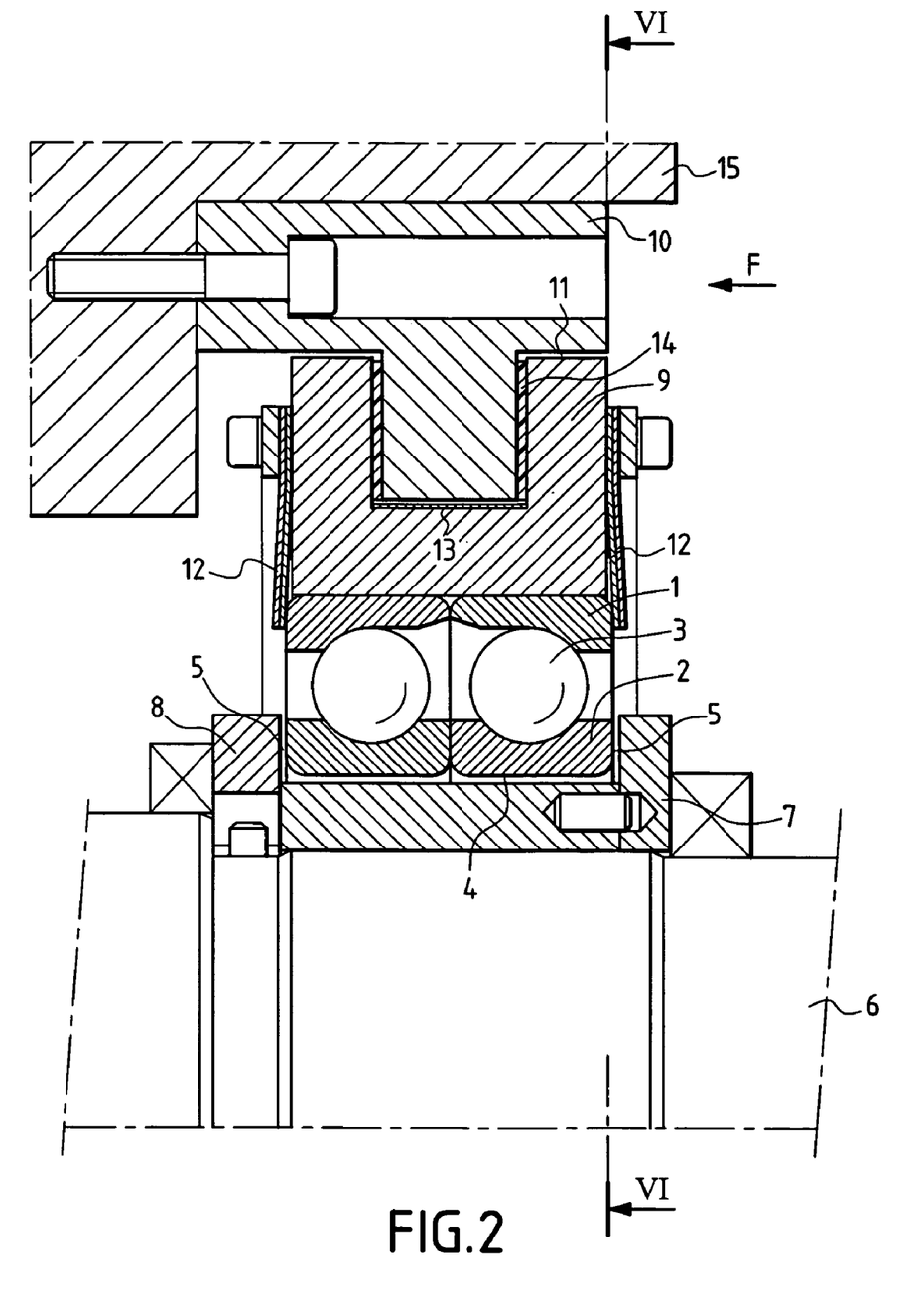
FIG. 2 is a half-section view in an axial plane of an emergency bearing constituting a first embodiment of the invention, in which the bearing member comprises a set of rolling elements held between two cages.

FIG. 2 shows an emergency bearing which is insensitive to axial load for use in combination with an active magnetic bearing which is not shown in the drawing. Proper operation of the bearing is ensured regardless of the disposition of the rotor 6 relative to the stator 15, in other words the rotor 6 may be either inside or else outside the stator 15.

The emergency bearing essentially comprises at least one bearing member, in this case represented by two rolling bearings, each comprising a stator cage 1, a rotor cage 2, and rolling elements 3 disposed between the stator and rotor cages 1 and 2.

In FIG. 2, the emergency bearing is shown in a position in which the radial magnetic bearings are operating normally. The rotor cages 2 of the bearing member are thus separated from the rotor 6 by radial clearance 4 of value $\epsilon_r/2$ which is about half the value of the airgap $\epsilon_r$ of the magnetic bearings. The radial clearance $\epsilon_r/2$ may advantageously be of a value lying in the range 0.15 mm to 0.3 mm, however it could also lie outside this range, depending on the application. The rotor cages 2 are likewise separated from first and second axial abutment elements 7 and 8 by respective axial clearance of value $\epsilon_a$ advantageously lying in the range about 0.2 mm to about 0.5 mm, but which could also be situated outside this range, depending on the application. The axial clearance enables the bearing member to present axial movement in either direction when an axial load is applied thereto.

The emergency bearing further comprises an emergency landing device comprising an annular female intermediate element 9 having flanges with a large contact area relative to a two-piece male stator element 10 that matches the female intermediate element 9. The intermediate element 9 is interposed between the stator cage 1 and the stator element 10 with radial clearance 11, 13 relative to said stator element which is fixed to the stator 15. The large contact area between the intermediate element 9 and the stator element 10 avoids pressure becoming too high when a large axial load is applied to this area. Springs 12 fixed on either side of the intermediate element 9 act axially on the bearing member, applying preloading thereto in both directions. In order to encourage movement of the inner bearing member, it is important to ensure that the bearings are not unloaded since that could lead to internal slip that is harmful to the proper operation of the system and to its longevity. Radially-acting damper means are interposed in the clearance 13 between the facing annular faces that are parallel to the axis of rotation of the inner portions of the intermediate and stator elements 9 and 10. These damper means may be constituted by a corrugated metal tape or by a viscoelastic ring. Furthermore, contact means 14 having a very low coefficient of friction are provided between the facing faces of the intermediate and stator elements 9 and 10 that extend perpendicularly to the axis of rotation. These contact means may be made by surface treatment of the contacting faces, by a deposit of the PTFE type or of the $MoS_2$ type, or by depositing any other similar lubricant.

When the magnetic bearings no longer provide their normal support function, the rotor 6 lands on the rotor cages 2 at a speed of rotation that is high, being close to the nominal speed of rotation. Thereafter, the rotor 6 slows down progressively while also presenting whirling type movement at a frequency that is limited, advantageously lying in the range one-fourth to one-third the frequency corresponding to the nominal speed of rotation of the machine, with this limitation being achieved by the damper system. Consequently, the centrifugal force acting on the rotor 6 is reduced to a fraction well below the value that the centrifugal force would present in the absence of damper means.

The damper device is not placed directly on the outer cages 1 of the bearings, but at a level where the intermediate element 9 is of greater diameter and where the intermediate and stator elements 9 and 10 are in direct, low-friction relationship.

By means of this device, it is guaranteed that regardless of the axial load applied to the emergency bearing system, the resulting radial force coming from this axial load via the large contact area 14 having a low coefficient of friction can under no circumstances oppose free radial movement of the system. Consequently, this enables the damper system 13 to remain effective and to perform the above-described function, which is the looked-for object of the emergency bearing system. It should be observed that the system will operate properly regardless of the axial load firstly because of the springs 12 which exert preloading in both directions on the bearing member, and secondly because of the axial clearance 5.

Figure 3:
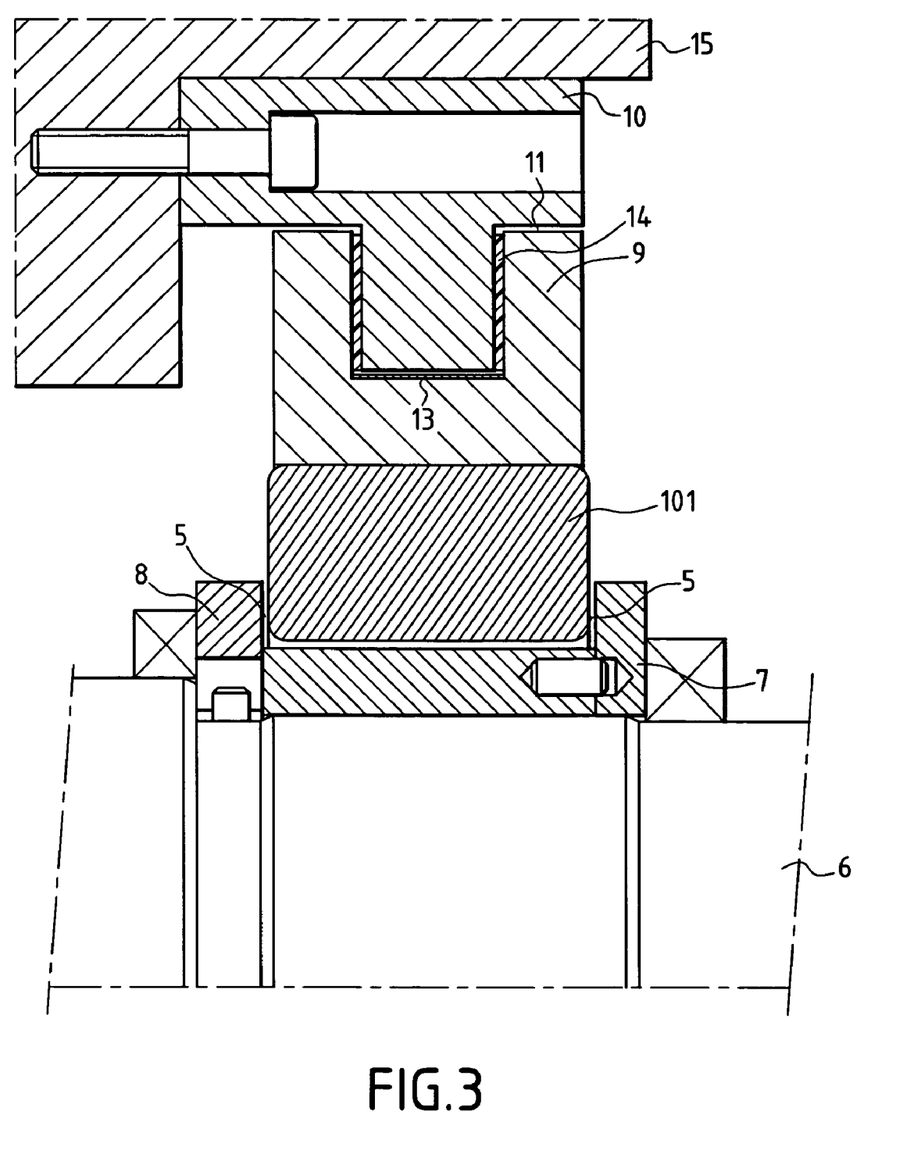
FIG. 3 is a view analogous to FIG. 2, but without the preloading means and with a bearing member comprising a smooth ring.

The emergency bearing of FIG. 3 differs from that of FIG. 2 solely in the arrangement of certain elements. The bearing member is a smooth ring 101 and therefore does not include an inner bearing member. Consequently, the springs fixed to the two sides of the intermediate element 9 are no longer needed.

Figure 4:
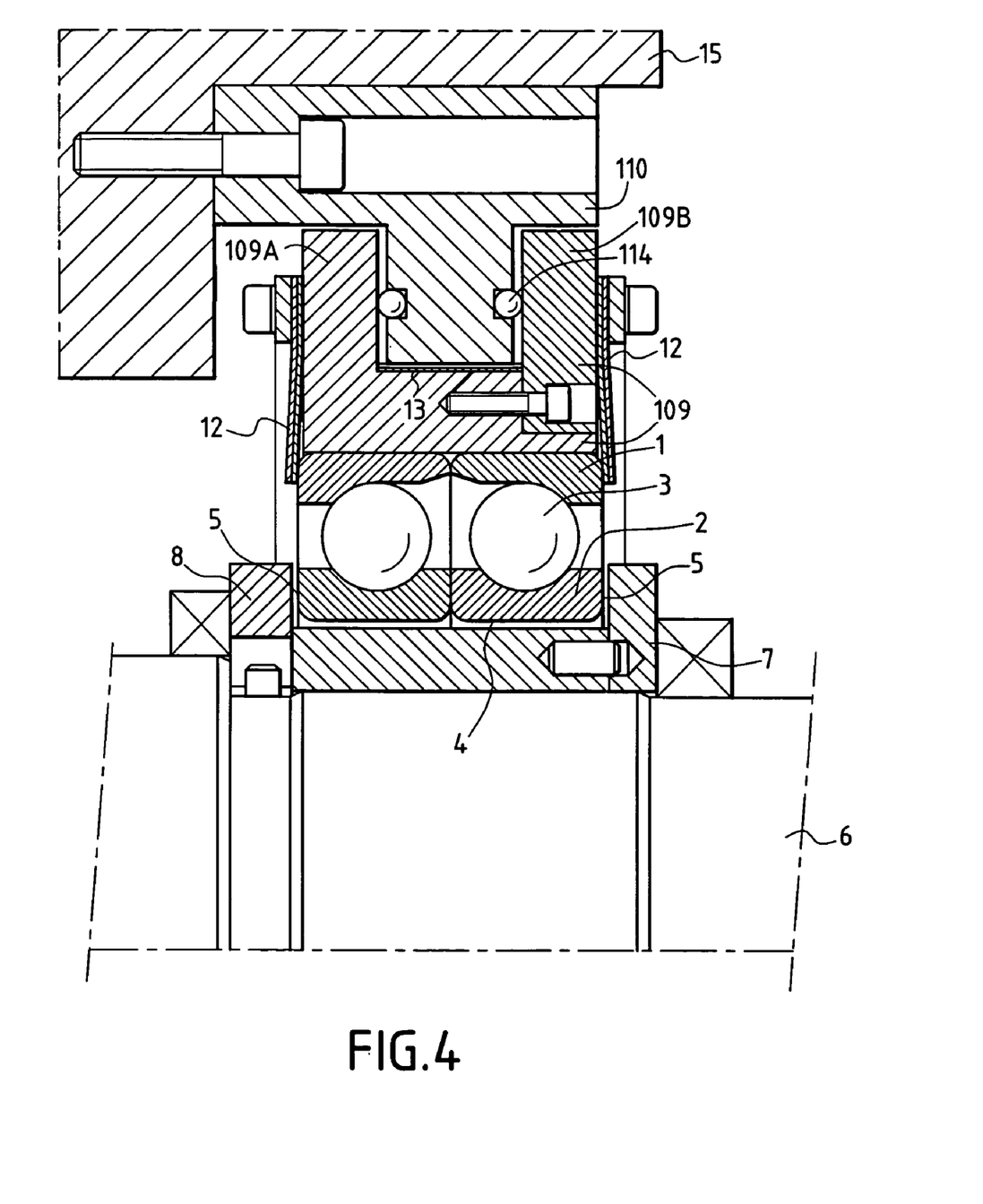
FIG. 4 is a half-section view in an axial plane of an emergency bearing in another embodiment of the invention.

In FIG. 4, the intermediate element 109 comprises a flanged female annular element in two portions 109A and 109B. However the stator element 110 is a body of revolution that can be made as a single piece. Also, the very low friction contact means comprise an axial ball bearing 114 inserted between the facing faces of the intermediate and stator elements 109 and 110 that extend perpendicularly to the axis of rotation. In this case, the load is shared over a large number of balls, thereby also guaranteeing a very low coefficient of friction.

The axial ball bearing 114 thus constitutes an alternative embodiment replacing the contact coating 14 having a very low coefficient of friction.

Figure 5:
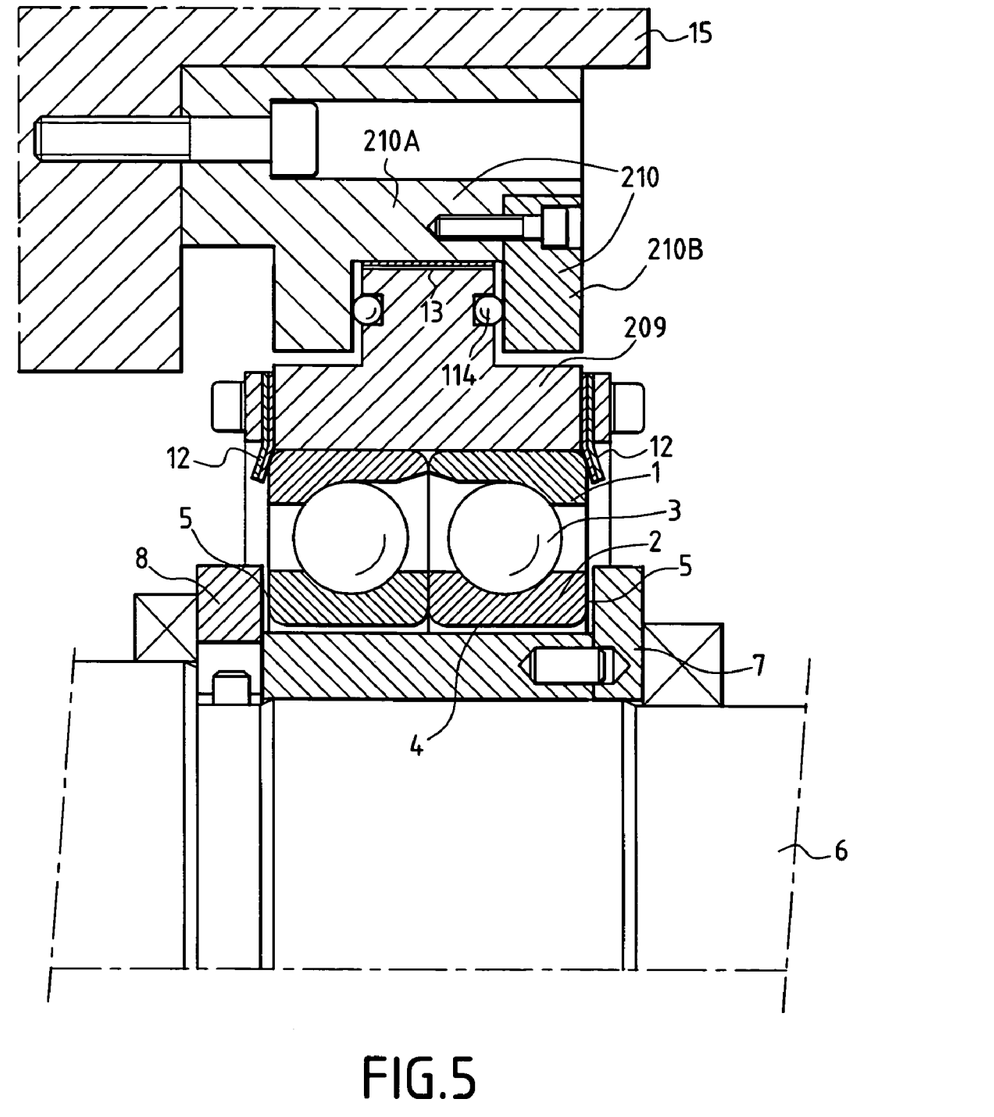
FIG. 5 is a half-section view in an axial plane of an emergency bearing in yet another embodiment of the invention.

FIG. 5 corresponds to another embodiment of the invention in which the stator element 210 is a flanged annular female part in two pieces 210A and 210B, and the intermediate element 209 is a male body of revolution made as a single piece and matching the female stator element 210.

Figure 6:
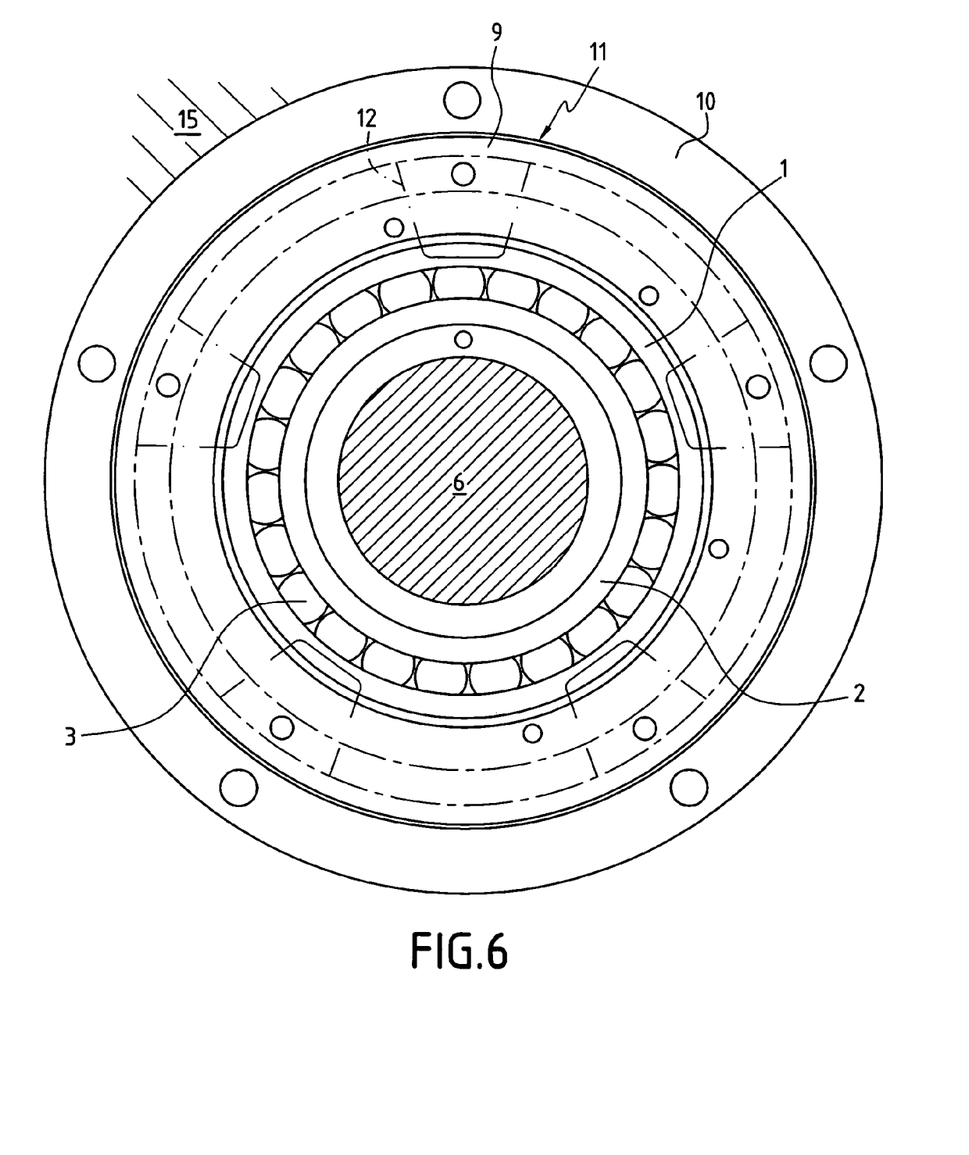
FIG. 6 is a view looking along line VI—VI of FIG. 2.

FIG. 6 is a view showing plane VI—VI of FIG. 2 for the case where the rotor 6 is internal and the bearing member comprising a stator cage 1, a rotor cage 2, and rolling elements 3 disposed between the stator and rotor cages 1 and 2, is mounted on the rotor 6. The springs 12 can also be seen fixed to the intermediate element 9 and thus applying preloading on the stator cage 1.

Figure 7:
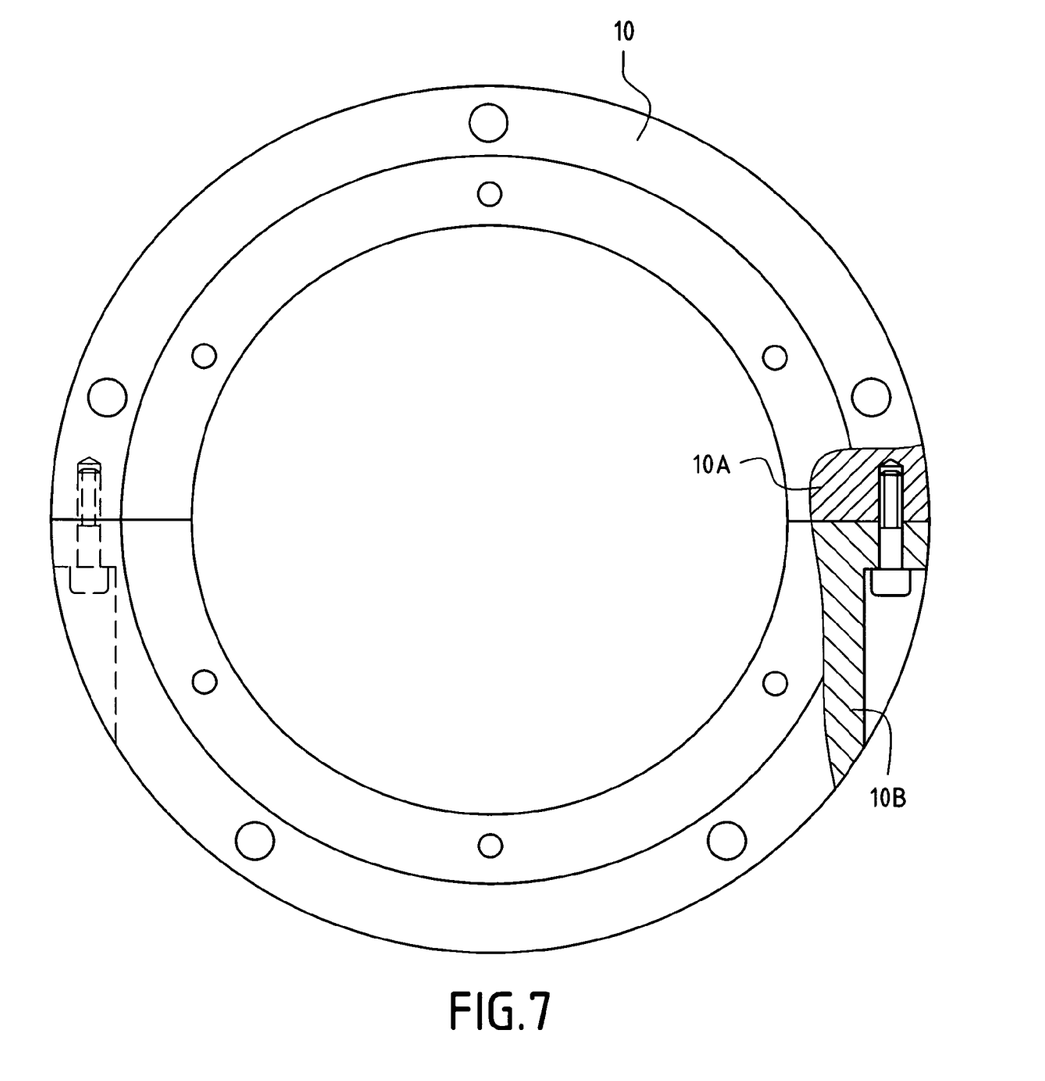
FIG. 7 is a view looking along arrow F of FIG. 2, with a cutaway portion showing the two-part stator element.

FIG. 7 is a view along arrow F of FIG. 2 and is partially cutaway to show the stator element 10 comprising two pieces 10A and 10B. This stator element 10 needs to be in two pieces in order to make it possible to assemble the device in the event of the intermediate element 9 being itself made as a single piece.

Various modifications can be applied to the embodiments described above without going beyond the ambit of the invention. In particular, the various embodiments can be combined with one another. For example, the axial ball bearing 114 of FIGS. 4 and 5 could be interchanged with the contact coating 14 of FIGS. 2 and 3. The smooth ring 101 could also be integrated in the embodiment of FIGS. 4 and 5 instead of the bearing member 1, 2, 3.

The invention claimed is:

1. An emergency bearing that is insensitive to axial load for a rotary machine having magnetic bearings presenting a mean radial airgap $\epsilon_r$ relative to a rotor, the emergency bearing comprising at least one bearing member such that a radial clearance is provided between the bearing member and the rotor, the value $\epsilon_r/2$ of the radial clearance being about half the mean radial airgap $\epsilon_r$ of the magnetic bearings, and an axial clearance ($\epsilon_a$) is provided on either side of the bearing member between the bearing member and first and second axial abutment elements, wherein the bearing further comprises an emergency landing device comprising an intermediate element having a large contact area with a stator element, said intermediate element being interposed between the bearing member and said stator element which is fixed to the stator with a radial clearance relative to said stator element, contact means having a very low coefficient of friction being provided between the intermediate element and the stator element to reduce friction during rotary motion between these two elements and preloading means interposed between the intermediate element and the bearing member and acting axially thereon.

2. An emergency bearing insensitive to axial load according to claim 1, wherein the preloading means are springs fixed to the two extreme sides of the intermediate element, thereby applying preloading in both directions to the bearing member.

3. An emergency bearing insensitive to axial load according to claim 1, wherein the bearing member comprises a stator cage, a rotor cage, and rolling elements disposed between the stator and rotor cages.

4. An emergency bearing insensitive to axial load according to claim 1, wherein the bearing member comprises a smooth ring.

5. An emergency bearing insensitive to axial load according to claim 1, wherein the value $\epsilon_r/2$ of the radial clearance lies in the range of about 0.15 mm to about 0.3 mm.

6. An emergency bearing insensitive to axial load according to claim 1, wherein the value $\epsilon_a$ of the axial clearance lies in the range of about 0.2 mm to about 0.5 mm.

7. An emergency bearing insensitive to axial load according to claim 1, wherein the intermediate element is a flanged annular female part and the stator element is a male part that matches the female intermediate element.

8. An emergency bearing insensitive to axial load according to claim 7, wherein the intermediate element is a part made in two pieces.

9. An emergency bearing insensitive to axial load according to claim 1, wherein the stator element is a flanged annular female part and the intermediate element is a male part that matches the female stator element.

10. An emergency bearing insensitive to axial load according to claim 1, wherein the stator element is a part made in two pieces.

11. An emergency bearing insensitive to axial load according to claim 1, wherein the contact means with very low friction comprises a deposit of low friction material on the facing faces of the intermediate element and the stator element that extend perpendicularly to the axis of rotation.

12. An emergency bearing insensitive to axial load according to claim 11, wherein the low friction material comprises PTFE or $MoS_2$.

13. An emergency bearing insensitive to axial load according to claim 1, wherein the contact means having very low friction is made by applying surface treatment to the facing faces of the intermediate element and the stator element that extend perpendicularly to the axis of rotation.

14. An emergency bearing insensitive to axial load according to claim 1, wherein the contact means having very low friction is an axial ball bearing interposed between the facing faces of the intermediate element and the stator element that extend perpendicularly to the axis of rotation.

15. An emergency bearing insensitive to axial load according to claim 1, wherein damper means is constituted by a metal strip interposed between facing annular faces of the inner portions of the intermediate element and of the stator element that extend parallel to the axis of rotation.

16. An emergency bearing insensitive to axial load according to claim 1, wherein the damper means are constituted by a viscoelastic ring interposed between the facing annular faces of the inner portions of the intermediate embodiment and of the stator element that extend parallel to the axis of rotation.

* * * * *